United States Patent
Balachandran et al.

(10) Patent No.: US 6,778,558 B2
(45) Date of Patent: *Aug. 17, 2004

(54) SYSTEM AND METHOD FOR INCREMENTAL REDUNDANCY TRANSMISSION IN A COMMUNICATION SYSTEM

(75) Inventors: Krishna Balachandran, Middletown, NJ (US); Richard P. Ejzak, Wheaton, IL (US); Sanjiv Nanda, Plainsboro, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,910

(22) Filed: Jan. 5, 1999

(65) Prior Publication Data

US 2003/0185181 A1 Oct. 2, 2003

Related U.S. Application Data

(60) Provisional application No. 60/075,501, filed on Feb. 23, 1998.

(51) Int. Cl.$^7$ ............................................. H04J 3/16
(52) U.S. Cl. .................. 370/470; 370/216; 714/751
(58) Field of Search ................................. 370/216, 470, 370/472, 473, 474, 476, 465, 468; 714/746, 751, 752

(56) References Cited

U.S. PATENT DOCUMENTS

| | | | | |
|---|---|---|---|---|
| 6,011,796 A | * | 1/2000 | Rezaiifar et al. | 370/394 |
| 6,088,342 A | * | 7/2000 | Cheng et al. | 370/320 |
| 6,226,294 B1 | * | 5/2001 | Caves | 370/395 |
| 6,317,430 B1 | * | 11/2001 | Knisely et al. | 370/394 |
| 6,353,907 B1 | * | 3/2002 | Van Nobelen | 714/746 |

* cited by examiner

Primary Examiner—Alpus H. Hsu
Assistant Examiner—Thien Tran

(57) ABSTRACT

A system and method for incremental redundancy transmission in a communication system. A time slot is provided having at least one sub-slot with a fixed size, and a data block sized to fit in the sub-slot, a header having a one data block sequence number in the header for the time slot. A parity block is sized smaller than the data block such that the parity block and the data block sequence number fit within the sub-slot. The data block and parity block are transmitted in the sub-slot within the time slot. In the header for the time slot the number of data blocks and parity blocks transmitted are identified.

18 Claims, 16 Drawing Sheets

FIG. 9

PCBP = 00
375: | AF (395) | CDSH (385) | DATA (320) | DATA (320) | DATA (320) |

PCBP = 01
375: | AF (395) | CDSH (385) | DATA (320) | DATA (320) | PCBH (390) | PARITY (340) |

PCBP = 10
375: | AF (395) | CDSH (385) | DATA (320) | PCBH (390) | PARITY (340) | PCBH (390) | PARITY (340) |

PCBP = 11
375: | AF (395) | CDSH (385) | PCBH (390) | PARITY (340) | PCBH (390) | PARITY (340) | PCBH (390) | PARITY (340) |

FIG. 10

PCBP = 00
375: | AF (395) | CDSH (385) | DATA (320) | DATA (320) | DATA (320) | DATA (320) |

PCBP = 01
375: | AF (395) | CDSH (385) | DATA (320) | DATA (320) | DATA (320) | PCBH (390) | PARITY (340) |

PCBP = 10
375: | AF (395) | CDSH (385) | DATA (320) | DATA (320) | PCBH (390) | PARITY (340) | PCBH (390) | PARITY (340) |

PCBP = 11
375: | AF (395) | CDSH (385) | PCBH (390) | PARITY (340) | PCBH (390) | PARITY (340) | PCBH (390) | PARITY (340) | PCBH (390) | PARITY (340) |

SYSTEM AND METHOD FOR INCREMENTAL REDUNDANCY TRANSMISSION IN A COMMUNICATION SYSTEM

CROSS REFERENCE TO RELATED APPLICATION

This application claims the benefit of U.S. Provisional Application, Serial No. 60/075,501, filed Feb. 23, 1998, and entitled System and Method for Incremental Redundancy Transmission in a Communication System.

BACKGROUND OF THE INVENTION

This invention relates to incremental redundancy transmission in a communication system, and more particularly, time slotted communication systems.

Link layer recovery protocols are used for error and loss recovery in data communication systems. Link layer recovery is especially crucial for wireless communications due to the particularly harsh loss and error characteristics of the link.

When a lost data frame is retransmitted, the receiver may combine the multiple received copies of the frame to increase the likelihood of correct decoding. Alternately, the transmitter may transmit additional parity information instead of retransmitting another copy of the lost frame. These methods of incremental redundancy transmission and soft combining are well known in the art.

Despite having performance potential, these methods have not found an application in practical systems. To enable efficient transmission, (that is, high rate coding), it is required that the protocol permits the transmission of proportionally small amounts of incremental parity information.

The problems associated with the efficient transmission were addressed in a paper, "A Proposal for IS-136+ Data Services" by Robert Van Nobelen and Nambirajan Seshadri of AT&T Laboratories and Krishna Balachandran, Richard Ejzak and Sanjiv Nanda of Bell Labs, Lucent Technologies Inc. attached herewith as Appendix I, the disclosure of which is hereby incorporated by reference. The paper proposed that the problem be handled by breaking up an uncoded data frame into D blocks, and introducing P parity blocks. Initially, all data blocks that constitute a frame are transmitted. If the receiver is unable to reconstruct, the transmitted frame parity blocks are transmitted one at a time until the receiver is able to recover the frame. If all P parity frames are transmitted, the corresponding coding rate is $$\frac{D}{D+P}.$$

Practical implementation of the proposed procedure requires transmission of frame and block sequence numbers for each block. In addition, variable sized blocks are used at different modulation formats (e.g., QPSK, 8 PSK and 16 PSK).

The present invention is directed to overcoming, or at least reducing, the effects of one or more of the problems set forth above.

SUMMARY OF THE INVENTION

In accordance with the present invention, there is provided a system and method for designing an incremental redundancy, adaptive modulation data communication system using a time slotted communication channel. The method performs the steps of establishing a time slot having at least one sub-slot with a fixed size and establishes a data block sized to fit in the sub-slot. A header is established having a data block sequence number in the header for the time slot. A parity block is also established which is sized smaller than the data block such that the parity block and data block sequence number fit within the sub-slot. The data block and parity block are transmitted in a sub-slot within the time slot. The method further performs the step of identifying, in the header for the time slot, the number of data blocks and parity blocks transmitted.

Stated generally, the present invention encompasses an incremental redundancy transmission communication system. The system comprises a time slot signal generator that creates a time slot signal having at least one sub-slot with a fixed size and a data block signal generator that creates a data block signal sized to fit in the time slot. A header adder that generates a header having a data block signal sequence number in the header for the time slot signal is also provided. A receiver is also provided that identifies in the header for the time slot signal, a number of data block signals consecutively transmitted.

The present invention further encompasses a method for incremental redundancy transmission in a communication system that uses radio (or retransmission) protocol link frames. The method comprises the step of creating a time slot signal having at least one sub-slot with a fixed size, creating a data block signal sized to fit in the sub-slot, establishing a header having a data block signal sequence number in the header for the time slot signal and identifying in the header for the time slot signal, the number of data block signals consecutively transmitted. The steps of providing, in a header of the time slot signal, a data block sequence number for a first data block signal in a sequence of data block signals and creating a parity block signal smaller than the data block signal such that the parity block signal sequence number fits within the sub-slot signal are also provided.

These and other features and advantages of the present invention will become apparent from the following detailed description, the accompanying drawings and the appended claims.

BRIEF DESCRIPTION OF THE DRAWINGS

FIG. 9 shows logical layer-1 frame formats assuming 8-level modulation with 3 blocks transmitted in each IS-136 time slot;

FIG. 10 shows logical layer-1 frame formats assuming 16-level modulation with 4 blocks transmitted in each IS-136 time slot;

DETAILED DESCRIPTION

Figure 1:
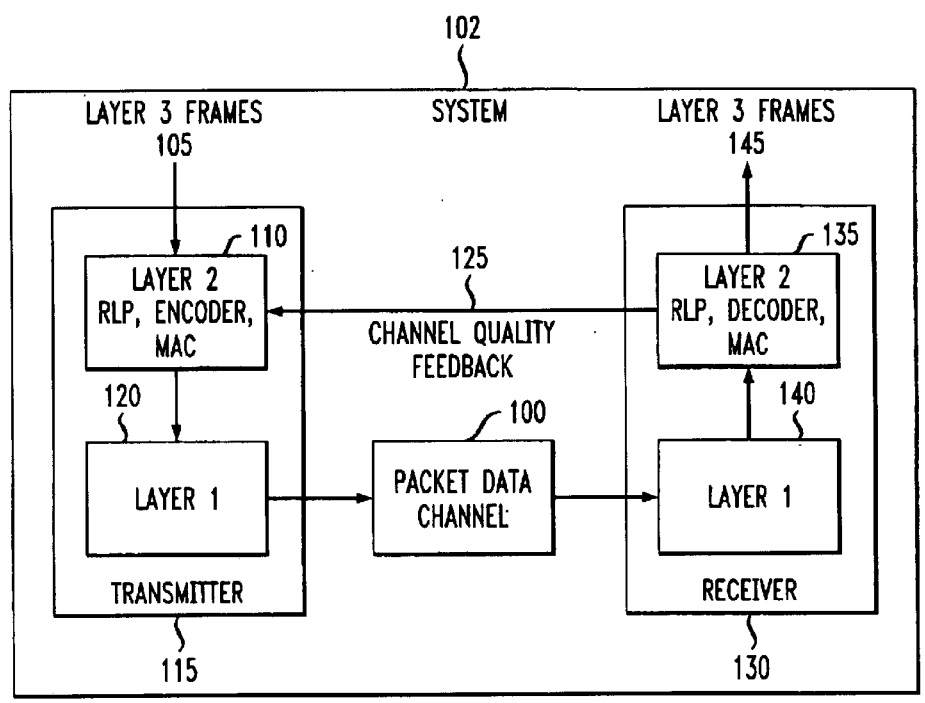
FIG. 1 shows a block diagram describing operation on a packet data channel in accordance with the invention.

Adaptive data rate schemes based on a combination of incremental redundancy coding and adaptive modulation are described earlier for circuit data. Such a channel quality measured technique is described in the commonly owned U.S. patent application Ser. No. 08/921454 titled "SYSTEM AND METHOD FOR MEASURING CHANNEL QUALITY INFORMATION; by Krishna Balachandran, Sanjiv Nanda, Srinivas R. Kadaba and Richard P. Ejzak, filed on Aug. 24, 1997, and U.S. patent application Ser. No. 08/938031 titled "ADAPTIVE MODIFICATION OF MODULATED AND CODED SCHEMES IN A COMMUNICATION SYSTEM", by Richard P. Ejzak, filed on Sep. 21, 1997, the disclosures of which are hereby incorporated by reference. These schemes achieve high throughput under delay constraints. Provided herein in accordance with the invention is a detailed description of the application of these techniques to 136+ packet data services.

Described in the application Ser. No. 08/938031 by Ejzak is the use of fixed size blocks of size such that an integer number can be accommodated in a slot of a time slotted transmission channel, as a method that enables adaptive modulation. In particular, two, three and four, blocks are accommodated respectively, in a QPSK, 8 PSK and 16 PSK TDMA slot. The requirements of a large per block sequence number to identify the data and parity packets, reduces the efficiency of this method of providing an incremental redundancy, adaptive modulation data communication system using a time slotted communication channel.

In describing the invention this application uses the media access control (MAC) layer assumptions which are based on the Open System Interconnections (OSI) model. OSI is an internationally accepted frame work of standards for communication between different systems made by different vendors. Most of the dominant communication protocols used today have a structure based on the OSI model. The OSI model organizes the communication process into seven different categories and places these categories in layered sequence based on their relation to the user. Layer 7 through 4 deal with the end to end communication message source and the message destination. While layers 3 through 1 deal with network access.

Layer 1, the physical layer, deals with the physical means of sending data over lines i.e. the electrical, mechanical and functional control of data circuits. Layer 2, the data link layer, deals with procedures and protocols for operating communication lines. Layer 3, the network layer, determines how data is transferred between computers and routing within and between individual networks.

It is appreciated that the packet data channel is capable of supporting multiple modulations. The MAC layer is provided with layer 3 frames and translates them into a byte stream using flag delimiters. A radio link protocol (RLP), also referred to as a retransmission link protocol, is used to transfer layer 2 frames between a cell and the mobile station and vice versa. The layer 3 byte stream is segmented into RLP frames, and a sliding window retransmission scheme is used for in-sequence delivery and recovery.

MAC layer transaction preferably starts with the transmission of a BEGIN frame. On the uplink and downlink, the MAC layer converts the layer 3 frames into a byte stream and packs the byte stream into a series of CONTINUE frames. The last new data burst of a transaction is transmitted using an END frame.

The BEGIN frame of each transaction is transmitted using 4-level modulation in a stop and wait mode to obtain an acknowledgment from the receiver. On reception of the BEGIN frame, the receiver initializes an RLP. The BEGIN frame is also used to initialize a partial echo (PE) for the transaction, and to specify the mode of operation for subsequent automatic retransmission request (ARQ) mode CONTINUE frames in that transaction.

There are two possible modes of operation for ARQ mode CONTINUE frames on the downlink and uplink. The first is incremental redundancy (Mode 0) and the second is fixed coding (Mode 1).

ARQ checks for errors in transmitted data. The sender encodes an error-detection (check) field in the transmitted data based on the contents of the message. The receiver then recalculates the check field and compares it with the check field received. If the check fields match, an ACK (acknowledgment) is transmitted to the sender. If both check fields do not match, a NAK (negative acknowledgment) is returned, and the sender retransmits the message.

For both uplink and downlink transmissions, bitmap feedback in the form of an ARQ status is provided. In addition, ACK/NAK feedback is provided on a per time slot basis for uplink transmissions.

For the best tradeoff between high throughput under delay objectives, incremental redundancy or fixed coding is combined with adaptive modulation. Results in the patent applications incorporated by reference herein previously show that if a delay objective is set, 8 or 16-level modulations fail to meet that objective across the $$\frac{C}{I+N}$$

range of interest. As the ratio of signal to interference plus noise decreases a smaller constellation (i.e. level 4 modulation) density is applied. Adaptation to 4 level modulation is employed under delay spread conditions.

FIG. 1 shows a high level block diagram of operation on the packet data channel 100 in accordance with the invention. A incremental redundancy transmission communication system 102 is shown were layer 3 frames 105 are provided to the layer 2, MAC layer 110, at the transmitter 115 and are translated into a byte stream using flags for demarcation. This permits the MAC layer 110 to provide a unified transport mechanism for different layer 3 protocols. This byte stream is segmented into RLP frames and assigned a frame sequence number (FSN). The FSN is not explicitly transmitted as part of the RLP frame.

For higher throughput in either mode, Layer 1 120 data is mapped into symbols chosen from a 4-level, 8-level or 16-level modulation based on knowledge of layer 2 backlog and channel quality feedback 125 from the receiver 130. The channel quality is measured in terms of the signal to interference plus noise ratio, $$\frac{C}{I+N}$$

at the input to the decoder in the layer 2 block 135 via physical layer 140 at the receiver 130. The decoder 135 then outputs the layer 3 frames 145.

Figure 2:
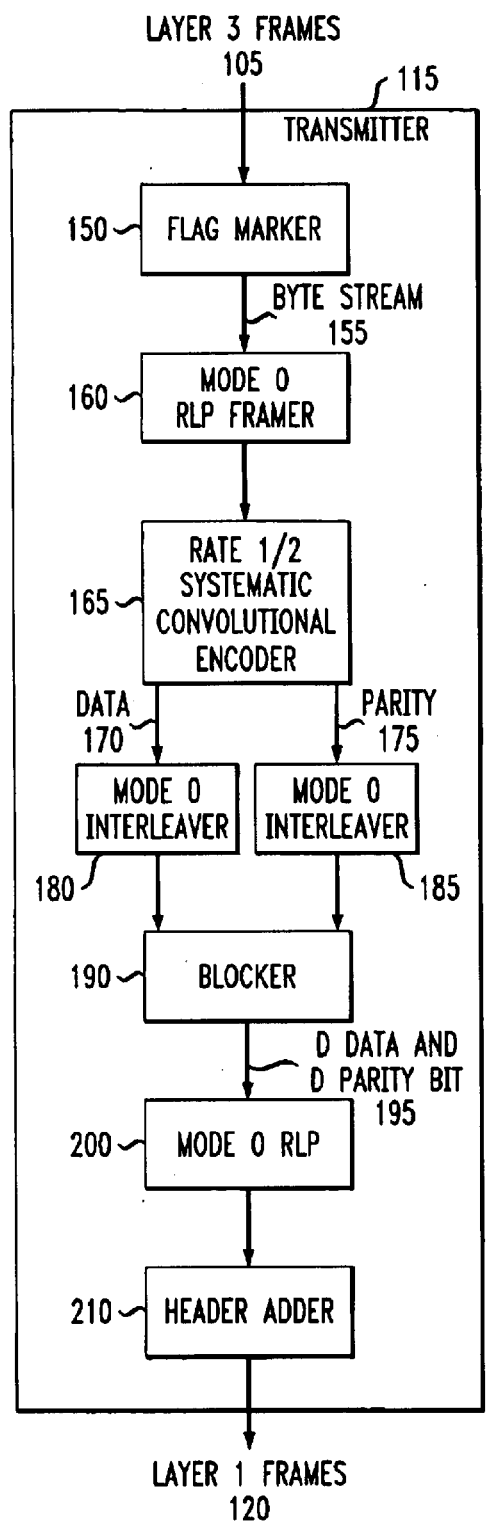
FIG. 2 shows a block diagram of the transmitter operation for Mode 0 and shows the blocks involved in conversion of Layer 3 frames into Layer 1 frames.

FIG. 2 shows the layer 2 110 functions (i.e, the procedure for mapping layer 3 frames 105 into layer 1 frames 120) of FIG. 1 for Mode 0. In Mode 0, the layer 3 frames 105 are translated by a flag delimiter 150 in a byte stream 155 time slot signal. The byte stream 155 is segmented into fixed length RLP frames and a frame check sequence (FCS) is computed, by a computation unit, on the data portion of the RLP frame (excluding the FSN) by an RLP framer 160 (a time slot signal generator). The resulting RLP frame is encoded using, for illustration purposes, a Rate ½ systematic convolutional encoder 165. A non-systematic convolutional encoder may alternatively be employed. The sub-slots of data bits 170 and the parity bits 175 from the systematic encoder 165 (also known as both a data block signal generator and parity block signal generator) are interleaved separately in Mode 0 interleavers (a first segmenter) 180 and (a second segmenter) 185, and are blocked, by a blocker 190 (also known as an assembler), into D data (a data block signal) and D parity blocks (a parity block signal) 195 which are assigned block identifications 1, . . . D, D+1, . . . 2D, respectively. The block sequence number (BSN), also known as a data block signal sequence number, is determined as a combination of the frame sequence number (FSN) and block identification. Fifteen parity bits are punctured in each parity block so that a parity block header containing the block sequence number may be added. Preferably the data blocks do not contain a block header. Depending on whether 4-level, 8-level or 16-level modulation is used, two, three or four blocks (data or parity), outputted from the Mode 0 RLP 200, are respectively combined into a single layer 1 data segment, by a MAC and layer 1 field adder (header adder and puncturing unit) 210, which is transmitted in a single IS-136 time slot signal. A data segment header indicating the block sequence number of the first data block in the segment is used to identify data block sequence numbers. The remaining data blocks have consecutive block sequence numbers. Along with the coded data segment header (CDSH), other MAC and physical layer headers such as modulation type and partial echo (PE), are added in each time slot signal.

Figure 3:
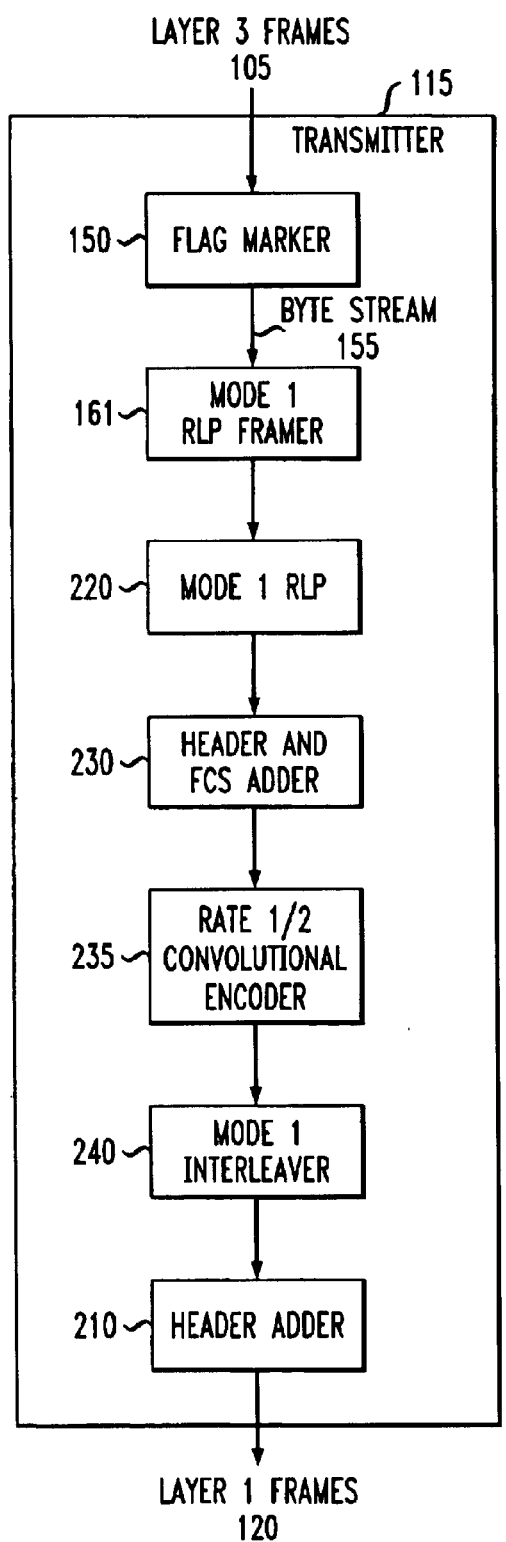
FIG. 3 shows a block diagram of the transmitter operation for Mode 1 and shows the blocks involved in conversion of Layer 3 frames into Layer 1 frames.

In Mode 1, FIG. 3, the layer 3 frames 105 are translated by a flag delimiter (flag marker 150) in a byte stream 155. The byte stream 155 is segmented into fixed length RLP frames and a FCS is computed on the data portion of the RLP frame by Mode 1 RLP framer 161. The resulting RLP frames are processed by the Mode 1 RLP 220. Depending on whether 4-level, 8-level or 16-level modulation is used, two, three or four consecutive RLP frames, outputted from the Mode 1 RLP 220, are respectively combined into a single data segment by a data segment and FCS combiner 230 (also called header and FCS adder). The FCS computed on this data segment and a data segment header indicating the FSN of the first RLP frame are added in header and FCS adder 230.

Then, the header, data and FCS are encoded using a Rate ½ convolutional encoder 235. The output of the encoder 235 is run through a Mode 1 interleaver 240 and additional MAC and physical layer header fields are added by a header adder 210. The output constitutes layer 1 data 120 which is transmitted in a single time slot. The data segment header is transmitted as part of the encoded layer 1 data segment in this case.

The advantage of incremental redundancy (Mode 0) is that it achieves a higher throughput because redundant bits are transmitted when necessary. The combination of incremental redundancy and adaptive modulation is proposed for both downlink and uplink directions.

Figure 4:
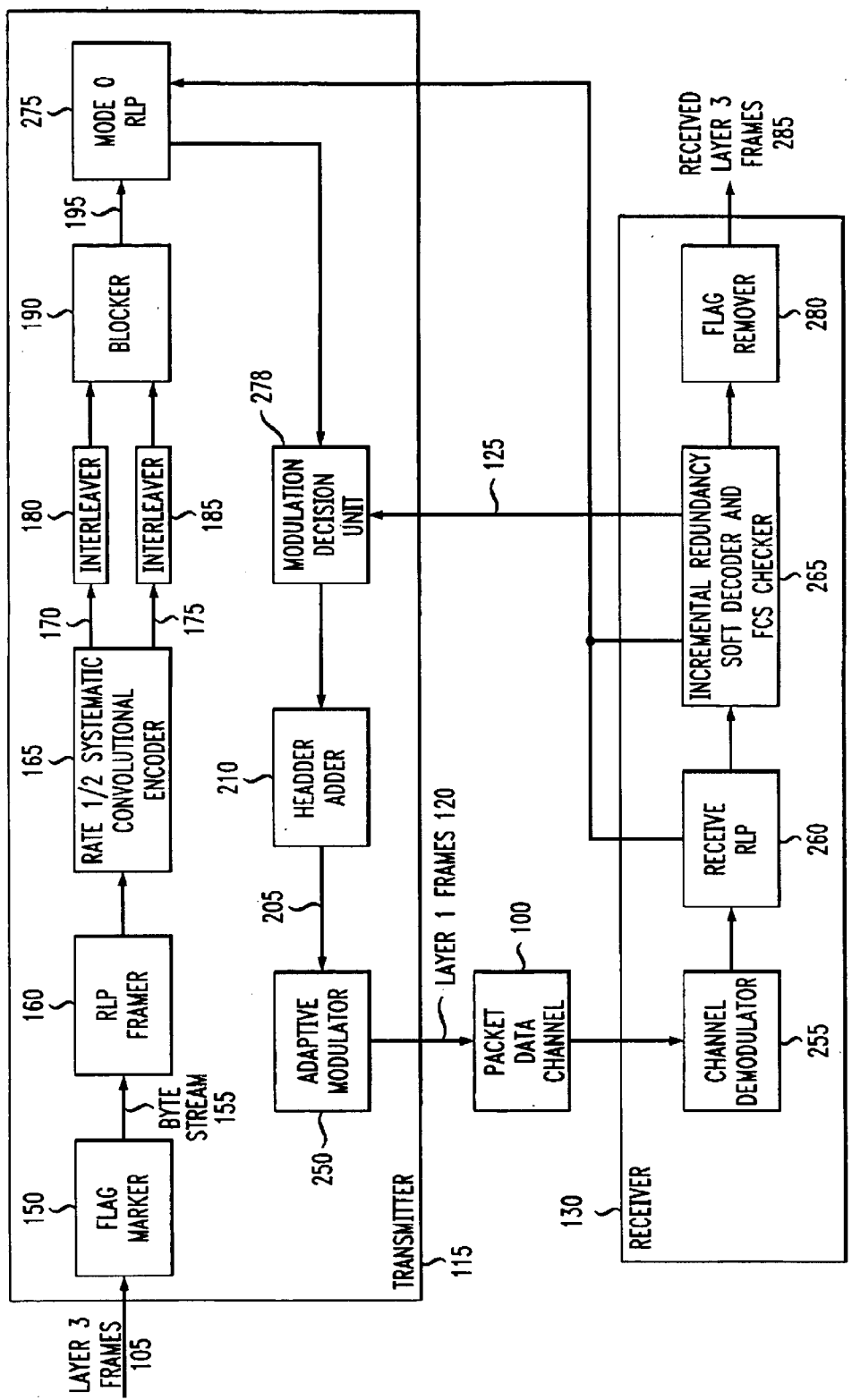
FIG. 4 shows a block diagram describing Mode 0 with a base station to mobile communication link and feedback interactions between the uplink and downlink.

FIG. 4 shows both the transmitting (shown in FIG. 1 as layer 2 functions) and receiving functions for the Mode 0 procedure of FIG. 2. The procedure described at transmitter 115 from the receipt of layer 3 frames 105 to the output 195 of blocker 190 is the same as described with reference to FIG. 2. The layer 1 frames 120 are output from the header adder 210 and input into an adaptive modulator 250. The adaptive modulator 250 modulates and transmits the layer 1 frames 120 through the packet data channel 100 to the channel demodulator 255 at the receiver 130. The channel demodulator 255 demodulates the modulated layer 1 frames 120 received from the packet data channel 100 and input the results to a receiver RLP 260. The receiver RLP 260 decodes the data segment header to determine the sequence numbers of the received data blocks, as well as the number of parity blocks. The receiver RLP 260 also decodes the parity block header to determine the sequence numbers of the parity blocks. If any of the headers of data on parity blocks are decoded correctly, the data is provided to the incremental redundancy soft decoder and FCS checker (IRSD) 265, and ACK/NAK (acknowledgment/non-acknowledgment) feedback 270 is provided to the transmit RLP 275 indicating acknowledgment of the data and parity blocks. The transmit RLP 275 and modulation decision unit 278 is a functional block that represents the functions of Mode 0 RLP 200 of FIG. 2.

The IRSD 265 receives the output from the receive RLP 260 and produces three outputs. The first output is a decoded data sequence of the received layer 1 frames 120 that is input into a flag remover 280. The second is an ACK/NAK feedback 270 output to the transmit RLP 275. The third output is a channel quality feedback signal 125, which is transmitted back to the transmit RLP 275 and modulation decision unit 278. The flag remover 280 removes the flags from the received data and outputs the received layer 3 frames 285.

Figure 5:
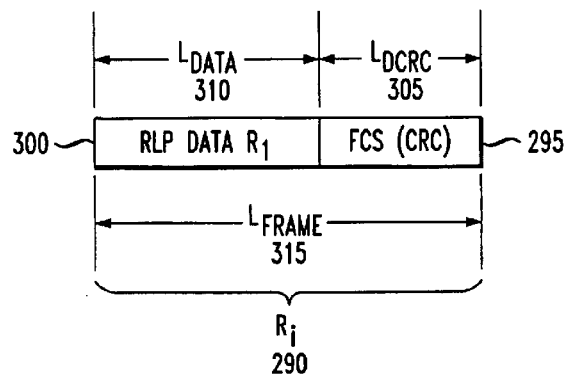
FIG. 5 illustrates the format for a time slot frame with of a data and header frame.

FIG. 5 shows the format of the RLP frame 290, output or the Mode 0 RLP framer 160, which is constructed by adding a FCS 295 to RLP data, $R_i$ 300. The FCS 295 is a cyclic redundancy check (CRC) of length $L_{DCRC}$ 305 computed over the data bits. The FCS 295 is added to each RLP frame 300 which consists of $L_{DATA}$ 310 data bits. The lengths $L_{DATA}$ 310 and $L_{DCRC}$ 305 are design parameters. The frames of length $L_{FRAME}$ 315=$L_{DATA}$ 310+$L_{DCRC}$ 305 are passed to the encoder 165 of FIG. 2.

Figure 6:
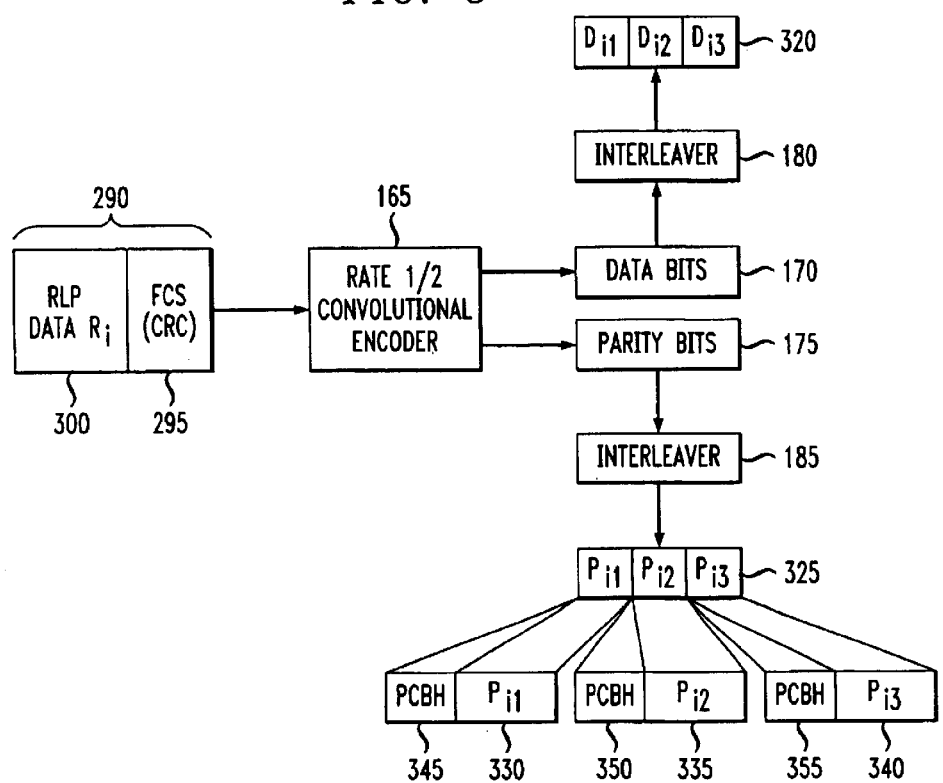
FIG. 6 shows a construction of data and parity blocks from radio link protocol (RLP) frames.

FIG. 6 shows that each RLP frame 290, of size $L_{FRAME}$ 315, FIG. 5, bits, is encoded using a binary rate ½ systematic convolutional code by encoder 165. The rate ½ binary convolutional encoder 165 is preferably a 32 state maximum free distance code with octal generators. There are $L_{FRAME}$ 315, FIG. 5, data bits 170, and $L_{FRAME}$ 315 parity bits 175, at the output of the encoder 165, FIG. 6, which are divided into blocks as described as follows.

The $L_{FRAME}$ 315, FIG. 5, data bits 170 at the output of the encoder 165 are segmented into D blocks of length $$L_{BLOCK} = \frac{L_{FRAME}(315)}{D}.$$

These blocks are called data blocks 320 which are denoted by $D_{ij}$ 320 (j=1 ... D). The parameter D determines the delay and/or throughput performance as described in the patent applications incorporated by reference herein. The parity bits 175 are punctured and segmented into D parity blocks 325 of equal size denoted by $P_{ij}$ 325 (j=1 ... D as an example $P_{i1}$ 330, $P_{i2}$ 335 and $P_{i3}$ 340). It is appreciated that puncturing of outputs of a convolutional encoder is a procedure of deleting a set of predetermined bits to decrease the number of parity bits. Of the $L_{FRAME}$ 315 parity bits 175 at the encoder 165 output, Dh parity bits are punctured (h in each of the D parity blocks 325); h is the size of the header required for each parity block.

To each parity block 330, 335 and 340, a parity/control block header (PCBH) 345, 350 and 355 is appended to the front of the parity block $P_{ij}$ 325. For parity blocks, PCBH 345, 350 and 355 contains a one bit PCBH header type (=1 for parity block) and a ten bit block sequence number (BSN). The PCBH 345, 350 and 355 is selectively encoded using a Hamming code.

The data blocks, $D_{i1}$, to $D_{iD}$ 320 contain no redundancy and represent a one to one mapping to the frame $R_i$ 290. The parity blocks $P_{i1}$ to $P_{iD}$ 325 contain parity information derived from $R_i$ 290 and are used by the protocol for forward error correction (FEC) upon decoding failure at the receiver 130 of FIG. 1. FIG. 6 is illustrative of the mapping of data 170 and parity 175 bits to blocks 320 and 325 when D=3 (i.e., with three data blocks per frame). A separate header for each data block 320 is not required. The data 320 and parity 325 blocks are derived from $R_i$ 290 by using a systematic rate ½ binary convolutional encoder 165 as shown. For a non-systematic convolutional encoder the same procedure is used. The output bits of the encoder 165 are mapped to the blocks 320 and 325 in an interleaved manner to maximize time and code diversity.

The Mode 0 RLP 200 of FIG. 2 delivers data in-sequence by initially sending just the RLP data blocks $D_{i1}$ ... $D_{iD}$ 320 followed by sending additional RLP parity blocks $P_{ij}$ 325 whenever the receiver 130 of FIG. 1 fails to decode the RLP frame $R_i$ 290 of FIG. 5 correctly. The transmitter 115 of FIG. 1 cannot discard the data 170 and parity 175 bits corresponding to a RLP frame $R_i$ 290 until it has received a positive acknowledgment from the receiver 130, FIG. 1, for $R_i$ 290. The protocol operates by maintaining in a table, frame table and block table, a bitmap for blocks that have been transmitted but not yet acknowledged. Upon obtaining feedback from the receiver 130, FIG. 1, the transmitting protocol updates the table and decides on which data 320 and/or parity 325 blocks to transmit in subsequent time slots.

Control blocks may be inserted instead of parity blocks 325 in the time slot. For each control block, the PCBH 345 header type bit is set to 0. Examples of control blocks include ARQ Status Block—indicates a bit map of received blocks along with the last in-sequence received block sequence number and END Block—used to indicate completion of a transmission.

The receive RLP 260 and the IRSD 265 of FIG. 4 is the peer of the Mode 0 RLP 200 of FIG. 2 and is responsible for combining the received blocks $D_{ij}$ 320 and $P_{ij}$ 325, FIG. 6, and jointly decoding them to recover the layer 2 frame $R_i$ 290. The receive RLP 260, FIG. 4, maintains a table to store the received data and parity blocks and decoded RLP frames 300, FIG. 6, until they are delivered in-sequence to layer-3 as layer 3 frames 285, FIG. 4. The blocks are retrieved from layer-1 in soft-decision format and to reduce memory overhead are stored in the receive table by quantizing to q levels.

The incremental redundancy decoder 265, FIG. 4, corresponds to the transmit encoder 165 of FIG. 4. It is passes the received subset of the soft-decision blocks $D_{ij}$ and $P_{ij}$ and attempts to decode using preferably a soft decision Viterbi algorithm. Any missing soft bits are treated as erasures by the decoder 265 of FIG. 4. The output of the Viterbi decoder is passed to the FCS decoder which computes the FCS and indicates to the receive RLP 260 whether the received frame $R_i$ 290 passed the frame check.

Figure 8:
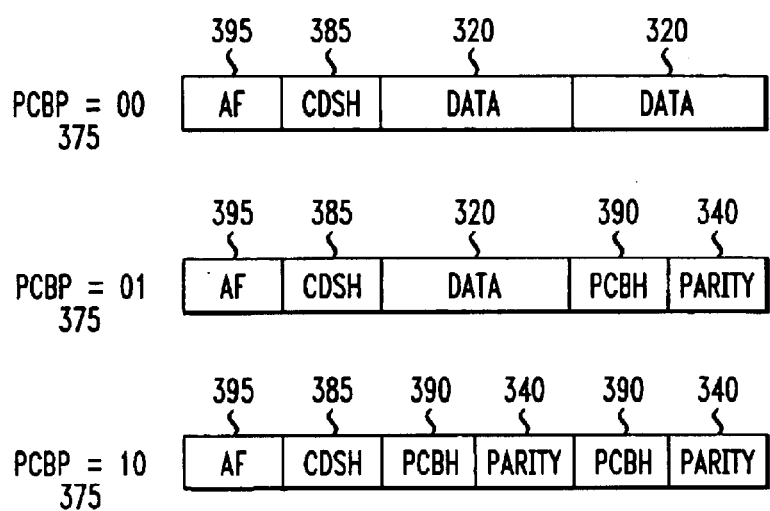
FIG. 8 shows logical layer-1 frame formats assuming 4-level modulation.

The data bit stream 170, FIG. 4, and parity bit stream 175 at the encoder output 165 are separately interleaved, by Mode 0 interleavers 180 and 185, and segmented into data and parity blocks by blocker 190. The two, three or four (combinations of data and parity/control) blocks, outputted by the Mode 0 RLP 200, are transmitted in each time slot corresponding to the use of 4-level, 8-level or 16-level modulation respectively. Data or parity blocks are selectively mapped directly into the Layer 1 data portion of an IS-136 time slot (DATA fields shown in FIGS. 11 and 12). FIGS. 8, 9 and 10 illustrate the logical Layer 1 frame 120, FIG. 5, formats as a function of the modulation type.

Figure 7:
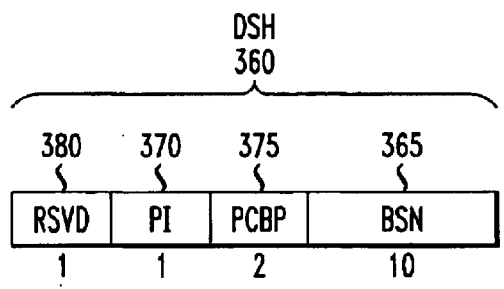
FIG. 7 illustrates the format for a data segment header (DSH) with the number of bits required for each field indicated.

FIG. 7 illustrates that a Layer 1 frame 120, FIG. 4, is associated with a data segment header (DSH) 360. The DSH 360 contains a block sequence number (BSN) 365 which preferably consists of ten bits. The BSN 365 is associated with the first data block in a time slot; if there are no data blocks, then the BSN 365 is given a default value which is ignored by the receiver 130 of FIG. 4. The DSH 360 also includes a poll indicator (PI) 370, FIG. 7, which preferably consists of one bit. The PI 370 is used by the system 102, FIG. 1, to request an ARQ status frame. The DSH 360 also includes parity/control block pointer (PCBP) 375 which preferably consists of two bits. The PCBP 375 indicates the composition of the time slot in terms of data and parity/control blocks. The DSH 360 also has a reserved (RSVD) 380 header which is preferably one bit in length for future needs.

The 14 bit DSH 360, FIG. 7, is encoded to obtain a 22 bit coded DSH (CDSH) 385 of FIGS. 8, 9 and 10. The encoding preferably employs Hamming codes. In addition each time slot contains a 12 bit coded partial echo (PE) assigned to the transaction in progress which identifies the recipient of the data on the downlink or the originator on the uplink.

On the downlink, each RLP frame of size 336 bits (40 octet RLP data frame+16 bits CRC) is encoded using a rate ½, memory five, systematic convolutional code. The number of data blocks per RLP frame (D) is set to a nominal value of three. The output of the encoder is segmented into three data blocks, each of size 112 bits, and three parity blocks, each of size, 97 bit (punctured from 112 bits). A 15 bit header parity/control block (PCBH) 390, FIGS. 8, 9 and 10, is used for each parity block. These blocks are carried two, three or four per time slot as discussed above.

On the uplink, each frame of size 342 bits (41 octet RLP frame+14 bits CRC) may be encoded using a rate ½, memory five, systematic convolutional code. The number of data blocks per RLP frame (D) is set to three. The output of the encoder is segmented into three data blocks, each of size 114 bits, and three parity blocks, each of size, 99 bits (punctured from 114 bits). A 15 bit header (PCBH) 390, FIGS. 8, 9 and 10, is used for each parity block. These blocks are carried two, three or four per time slot as discussed above.

FIG. 8 shows the logical layer-1 frame formats assuming level 4 modulation with two blocks transmitted in each IS-136 time slot. The PCBP 375 value in the DSH 360, FIG. 7, is used to identify the composition of the data segment in the time slot in terms of data and parity blocks. As an example, PCBP 375=00 indicated two parity blocks, PCBP 375=01 indicates one data and one parity block and PCBP 375=10 indicates two parity blocks. FIG. 9 shows the use of PCBP and the composition of time slot for 8 level modulation and FIG. 10 is for 16 level modulation.

Fields such as adaptation field (AF) 395, FIGS. 8, 9 and 10, and DSH 360, FIG. 7, assume special positions in the time slot and are not transmitted as part of the layer-1 data. The block sequence number (BSN) 365, FIG. 6, in the CDSH 385, FIGS. 8, 9 and 10, denotes the sequence number corresponding to the first data block 320 in the slot. If only parity blocks 340 are transmitted, this field is ignored. In addition to the fields shown above, the coded PE assigned to the MAC Layer transaction is used as a mobile station identifier.

FIGS. 11, 12, 13 and 14 are illustrative of examples of the process performed by the receive RLP 260, FIG. 4, IRSD 265, feedback 270 to the Mode 0 RLP 275, and the Mode 0 RLP 275. In step 400 of FIG. 11, the receive RLP 260, FIG. 4, receives a demodulated time slot from the channel demodulation 255 and in step 405, FIG. 11, decodes the data segment header (DSH) 360 of FIG. 7. In decision step 410, if the DSH 360, FIG. 7, is successfully decoded the process continues to step 415, FIG. 11. If the DSH 360, FIG. 7, is not successfully decoded the process instead continues to step 420, FIG. 11. In step 420, the receive RLP 260, FIG. 4, discards the time slot and the process continues to node A 425, FIG. 11, which starts the new process at the IRSD 265 of FIG. 4.

Figure 11:
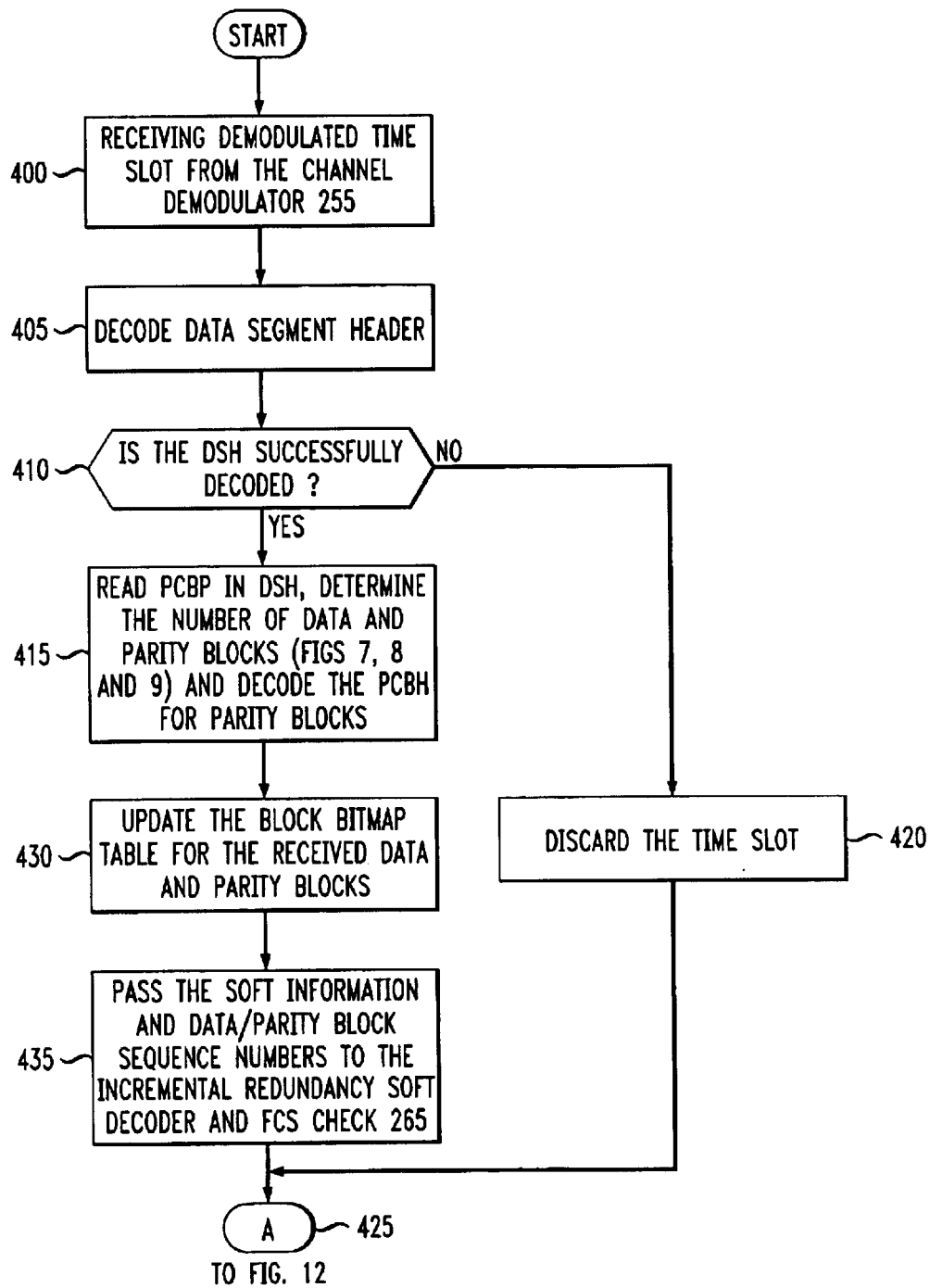
FIG. 11 shows a part of a composite logical flow chart, shown also in FIG. 12, of the process performed at the incremental redundancy soft decoder and FCS checker of FIG. 4.

If the DSH 360, FIG. 7, is successfully decoded the receive RLP 260, FIG. 4, in step 415, FIG. 11, reads the PCBP 375, FIGS. 7, 8, 9 and 10, in the DSH 360, FIG. 7, and determines the number of data 320, FIG. 6, and parity blocks 325 and decodes the PCBH 345, 350, 355 FIG. 6, 390 FIGS. 8, 9 and 10 for the parity blocks. The receive RLP 260, FIG. 4, then, in step 430, FIG. 11, updates the block bitmap table for the received data and parity blocks and in step 435 passes the soft information and data/parity block sequence numbers to the IRSD 265 and continues the process at the IRSD 265 at node A 425.

Figure 12:
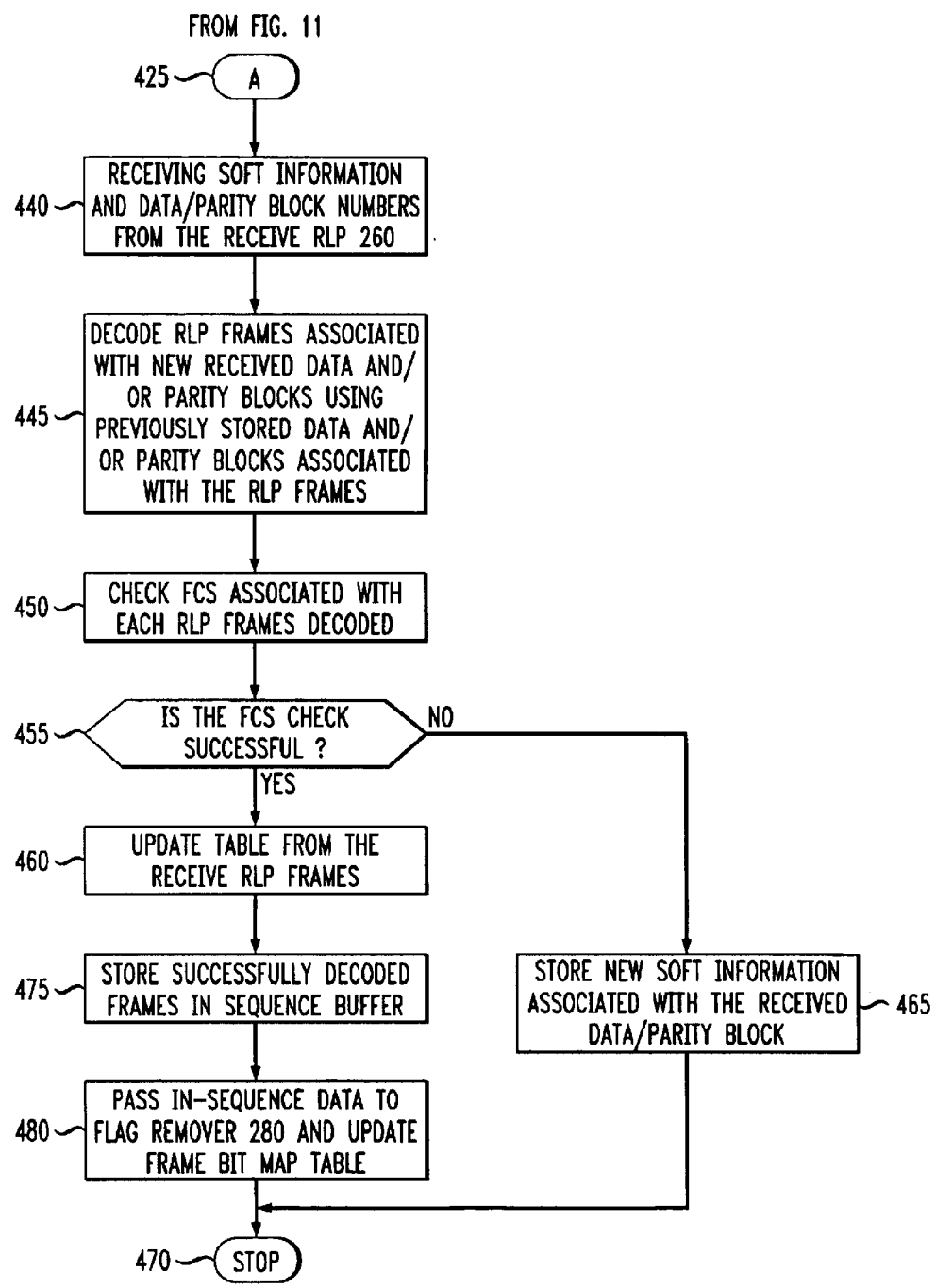
FIG. 12 shows another part of the composite logical flow chart, shown also in FIG. 11, of the process performed at the receive RLP of FIG. 4.

FIG. 12 shows the process performed by the IRSD 265 of FIG. 4. The process starts in step 440, FIG. 12, the IRSD 265, FIG. 4, receives soft information and data/parity block numbers from the receive RLP 260. In step 445, FIG. 12, the IRSD 265, FIG. 4, decodes the RLP frames associated with the new received data and/or parity blocks using previously stored data and/or parity blocks associated with the RLP frames. The IRSD 265, in step 450, FIG. 12, then checks the FCS associated with each RLP frame decoded. In decision step 455, if the FCS check is successful the process continues to step 460. If the FCS check is not successful the process instead continues to step 465. In step 465, the new soft information associated with the received data/parity block is stored and the process ends at 470.

If the FCS check is successful, the IRSD 265, FIG. 4, in step 460, FIG. 12, updates the table from the RLP frames and in step 475 stores the successfully decoded frames in sequence buffer. In step 480, the IRSD 265, FIG. 4, passes the in-sequence data to the flag remover 280 and updates the frame bit map table and ends the process at 470, FIG. 12.

Figure 13:
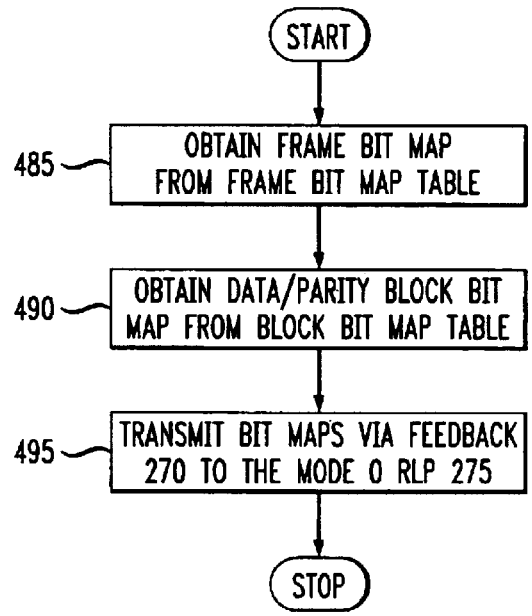
FIG. 13 shows a logical flow chart of the process of generating the feedback signal from the receive RLP and incremental redundancy soft decoder and FCS checker to the Mode 0 RLP of FIG. 4.

FIG. 13 illustrates the process of generating the feedback signal 270 of FIG. 4. First the receive RLP 260, FIG. 4, obtains the frame bit map from the frame bit map table in step 485, FIG. 13. The receive RLP 260, FIG. 4, then obtains the data and/or parity block bit map from the block bit map table in step 490, FIG. 13, and transmits the bit maps via feedback signal 270, FIG. 4, to the mode 0 RLP 275 in step 495, FIG. 13.

Figure 14:
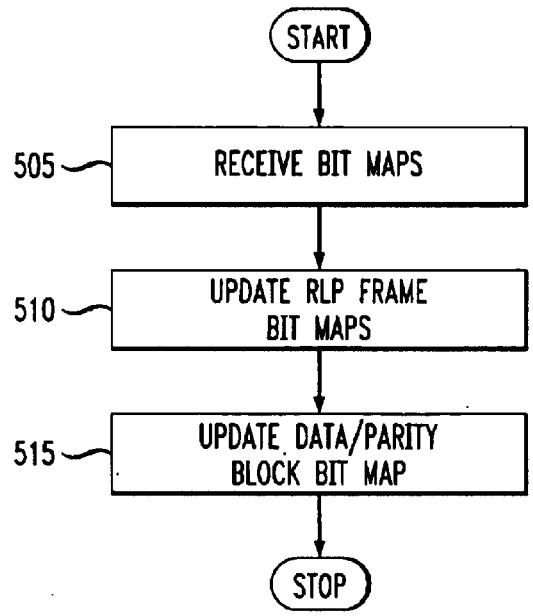
FIG. 14 shows a logical flow chart of the process of updating the bit maps at the Mode 0 RLP from the feedback described in FIG. 13.

FIG. 14 is illustrative of the mode 0 RLP 275, FIG. 4, processing the feedback signal 270. In step 505, the mode 0 RLP 275, FIG. 4, receives the bit maps transmitted by the receive RLP 260. The mode 0 RLP 275 then updates the RLP frame bit maps in step 510, FIG. 14, and updates the data and/or parity block bit maps in step 515.

Figure 15:
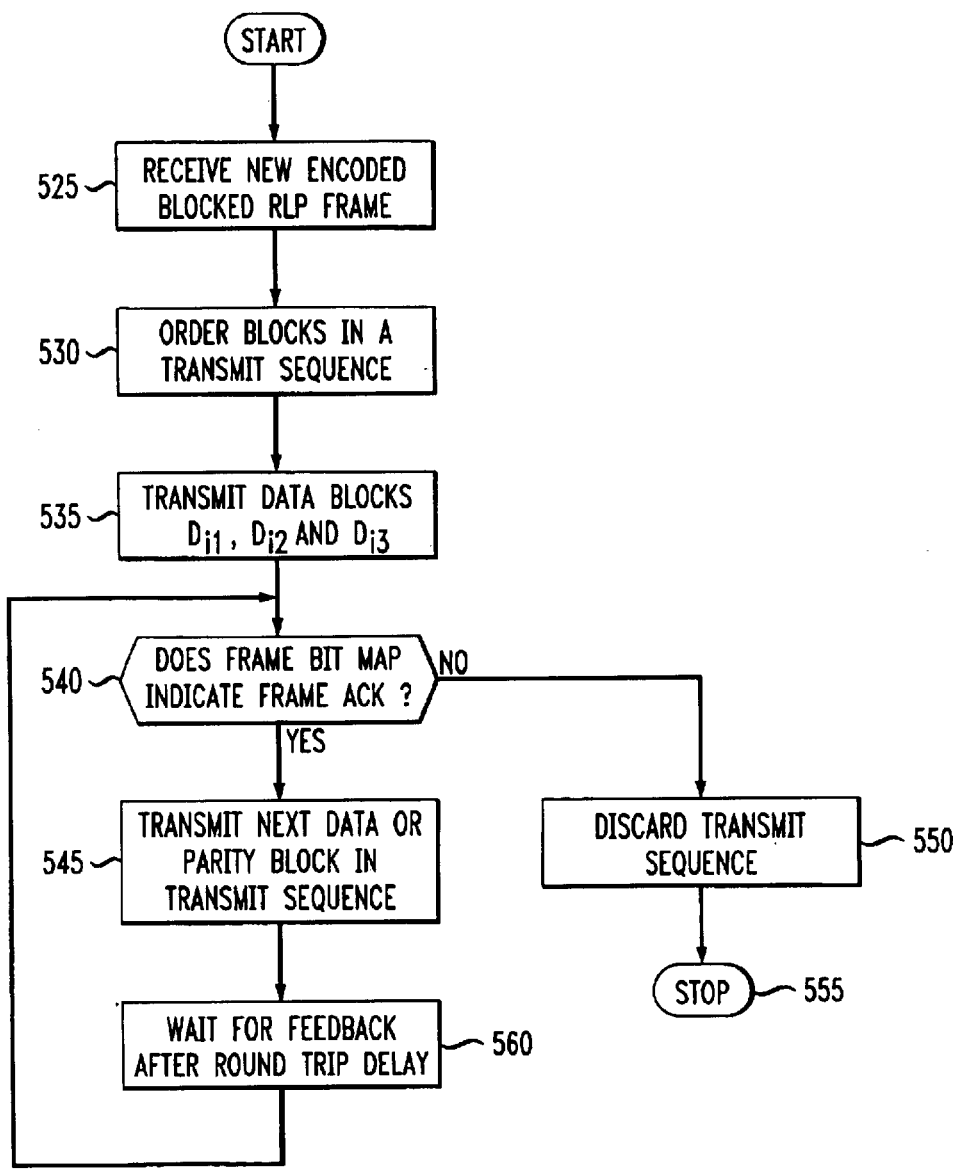
FIG. 15 shows a logical flow chart of the process of determining the transmission of data and/or parity blocks for each RLP frame without using block bitmaps.

FIG. 15 illustrates the process of transmitting data and/or parity blocks for each RLP frame if only frame bit map are used. In step 525, the mode 0 RLP 275, FIG. 4 receives a new encoded blocked RLP frame and in step 530 orders the block of the RLP frame into a transmit sequence. As an example a round robin sequence of $D_{i1}$, $D_{i2}$, $D_{i3}$, $P_{i1}$, $P_{i2}$ and $P_{i3}$ is used where $D_{i1}$ repeats after $P_{i3}$. In step 535, the mode 0 RLP 275, FIG. 4, transmits the data blocks $D_{i1}$, $D_{i2}$ and $D_{i3}$. In decision step 540, if the frame bit map indicates a frame acknowledgement (ACK) at the receive RLP 260, FIG. 4, the process continues to step 545. If instead a NAK is registered at the receive RLP 260, FIG. 4, the process continues to step 550. In step 550, the mode 0 RLP 275, FIG. 4, discards the transmit sequence and the process ends at 555.

At step 545, the mode 0 RLP 275, FIG. 4, transmits the next data or parity block in the transmit sequence and waits in step step 560 for the receive RLP 260 to respond. The process then continues back to decision step 540 and the process continues unit all the blocks are properly transmitted.

Figure 16:
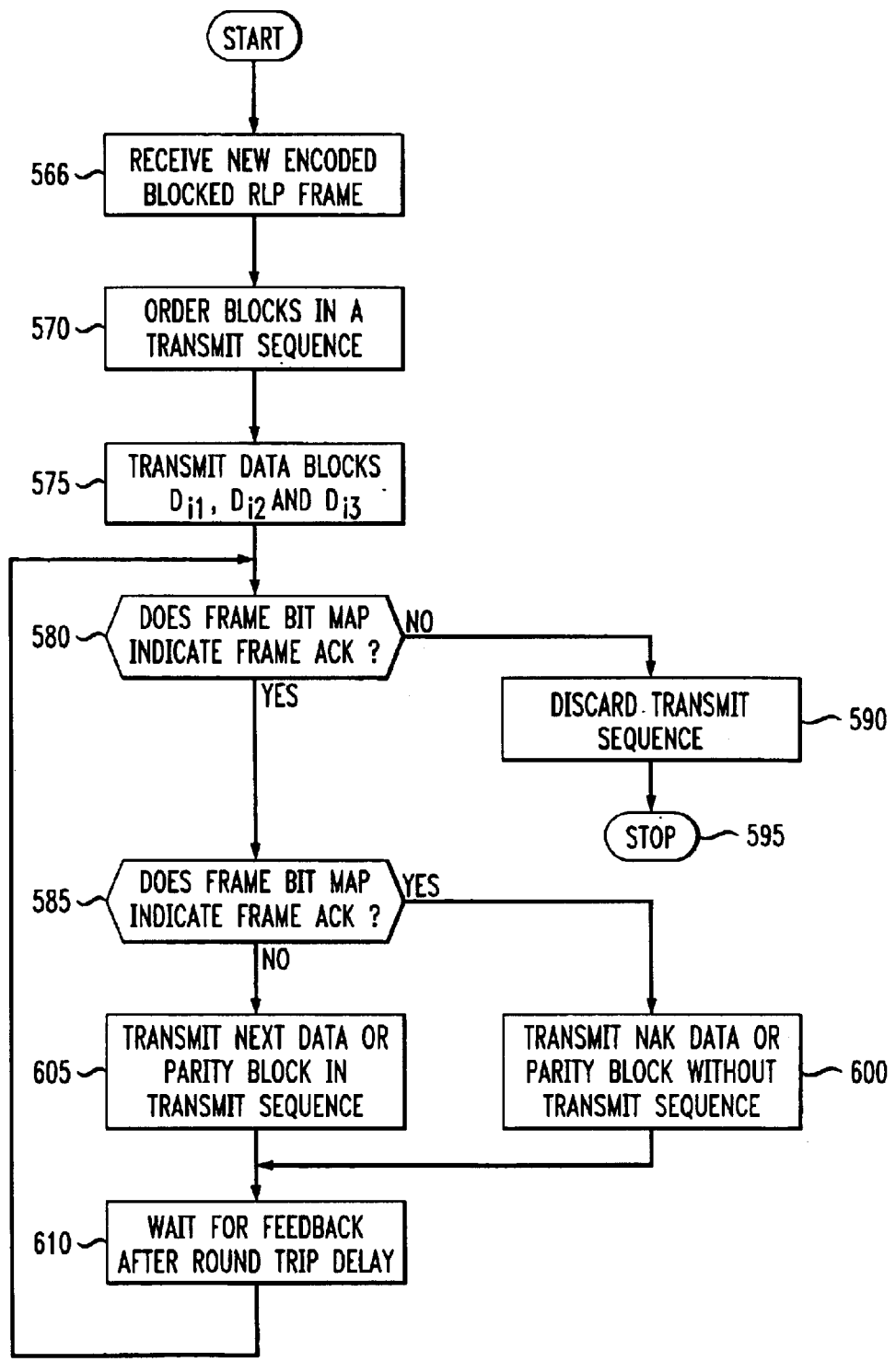
FIG. 16 shows a logical flow chart of the process of determining the transmission of data and/or parity blocks for each RLP frame using block bitmaps and frame bitmaps.

FIG. 16 illustrates the process of transmitting data and/or parity blocks for each RLP frame if both a block and a frame bit map are used. In step 565, the mode 0 RLP 275, FIG. 4, receives a new encoded blocked RLP frame and in step 570 orders the block of the RLP frame into a transmit sequence. As an example a round robin sequence of $D_{i1}$, $D_{i2}$, $D_{i3}$, $P_{i1}$, $P_{i2}$ and $P_{i3}$ is used where $D_{i1}$ repeats after $P_{i3}$. In step 575, the mode 0 RLP 275, FIG. 4, transmits the data blocks $D_{i1}$, $D_{i2}$ and $D_{i3}$. In decision step 580, if the frame bit map indicates a frame acknowledgement (ACK) at the receive RLP 260, FIG. 4, the process continues to step 585. If instead a NAK is registered at the receive RLP 260, FIG. 4, the process continues to step 590. In step 590, the mode 0 RLP 275, FIG. 4, discards the transmit sequence and the process ends at 595.

At decision step 585, if the block bit map indicates a block non-acknowledgement (NAK) at the receive RLP 260, FIG. 4, the process continues to step 600. If instead, decision step 585 result in ACK, the process continues to step 605. At step 605, the mode 0 RLP 275, FIG. 4, transmits the next data or parity block in the transmit sequence and waits in step 610 for the receive RLP 260 to respond. The process then continues back to decision step 580 and the process continues unit all the blocks are properly transmitted.

If a NAK is the result of decision step 585, the process proceeds to step 600. At step 600, the mode 0 RLP 275, FIG. 4, transmits NAK data or parity block without a transmit sequence and waits in step 610 for the receive RLP 260 to respond. The process then continues back to decision step 580 and the process continues unit all the blocks are properly transmitted.

Figure 17:
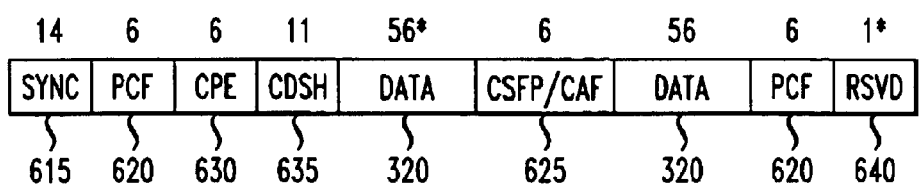
FIG. 17 shows a Mode 0 downlink time slot format.

FIG. 17 shows a downlink time slot format for Mode 0. The time slot has the following fields: SYNC—synchronization field (SYNC) 615, packet channel feedback (PCF) 620, coded superframe phase (CSFP) and coded adaptation field (CAF) (shown as CSFP/CAF 625), coded partial echo (CPE) 630, coded data segment header (CDSH) 635, 385, FIGS. 8, 9 and 10, reserved (RSVD) 640 and data block 320 FIGS. 6, 8, 9 and 10.

The time slot structures for the downlink and uplink preferably use differentially encoded PSK (DPSK) constellations. If coherent PSK is used, pilot symbols and reference symbols are inserted at appropriate positions in the time slot structure.

The PCF 620 fields are used as a mechanism for providing ACK/NAK 270, FIG. 4, and channel quality feedback 125, FIG. 4, and time slot assignments on the reverse packet data channel. The CAF 625 on the downlink consists of two bits which indicate the modulation format (4-level, 8-level or 16-level) used for the data. The layer-1 data fields consist of two, three or four blocks which are constructed using the procedure described earlier in FIGS. 8, 9, 10 and 11. The adaptation field, superframe phase (SFP) and one reserved bit are encoded together using the same Hamming code that is used for CDVCC in IS-136. 22 bits are used for the CDSH field 635, and a 12 bit CPE 630 field is used to identify the recipient of the data. The SYNC 615 field is transmitted using $\pi/4$-DQPSK. The CSFP/CAF 625, PCF 620, CPE 630 and CDSH 635 are also transmitted using 4-level modulation.

Contention accesses are transmitted using 4-level modulation. Higher level modulations (8-level and 16-level) are used by mobile stations which have more than one burst to transmit in ARQ CONTINUE mode, and are sniffing for reservation based transmission opportunities.

Figure 18:
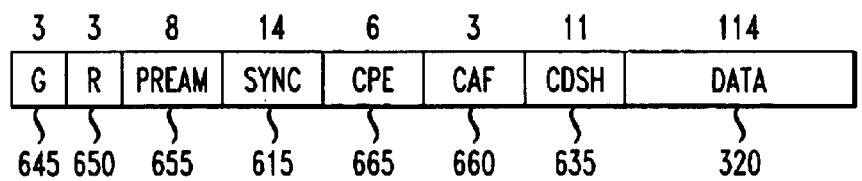
FIG. 18 shows a Mode 0 uplink time slot formal.

FIG. 18 shows the preferred uplink time slot structure. The guard (G) 645, ramp (R) 650, preamble (PREAM) 655 and SYNC 615 fields are maintained as in IS-136; a new coded adaptation 20 field (CAF) 660 is introduced to indicate the modulation format for the data. Two bits are used for the modulation type; these are encoded using a (6,2) code. The CDSH 635 uses 22 bits, and a 12 bit CPE 665 is used to identify the mobile station. G 645, R 650, PREAM 655, CPE 665, CDSH 635 and CAF 660 are transmitted using 4-level modulation.

The modulation type is fixed for a time slot and not over an RLP frame or an entire MAC Layer transaction. Layer 1 determines the modulation type to use for the next time slot based on the channel quality feedback 125, FIG. 4, from the receiver 130 and the needs of layer 2. The modulation formats utilized are 4 level (DQPSK or $\pi/4$-coherent PSK), 8 level (differential or coherent) and 16 level (PSK, DPSK or QAM) modulation. A two bit adaptation field is used to indicate the coding and/or modulation format used. Table 1 shows the mapping of the AF values to corresponding modulation formats.

A default value specifies the default DQPSK format with Rate 5/6 coding within the time slot to allow different packet data channel frame formats and interworking between incremental redundancy and coding modes.

TABLE 1

| AF | Coding and/or Modulation Format |
|---|---|
| 00 | 4-level ($\pi/4$-QPSK or $\pi/4$-DQPSK) |
| 01 | 8-level (PSK or DPSK) |
| 10 | 16-level (QAM, PSK or DPSK) |
| 11 | Default (e.g. rate 5/6, memory 5 convolutional coding with 4-level modulation) |

Figure 19:
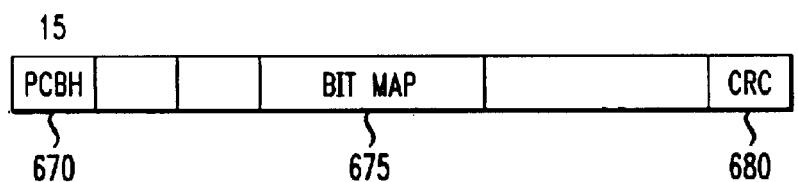
FIG. 19 shows uplink ARQ Status block logical format with 2 bits used for channel quality feedback.

Channel Quality Feedback (CQF) 125, FIG. 4, is provided by the mobile station on the reverse packet data channel in a layer-2 "ARQ Status" block as shown in FIG. 19. The ARQ status block is preferably transmitted in any reserved uplink time slot. A two bit channel quality indicator is used to denote the maximum allowable modulation type.

The PCBH 670 for the ARQ status block consists of one bit PCBH header type (=0), one bit control block type (=0, for ARQ status block), two bit CQF field, seven bit frame sequence number (FSN), identifying the beginning frame for the bit-map feedback.

The PCBH 670 is encoded using the (15,11) code. The rest of the ARQ status block consists of the bit-map feedback 675 and CRC 680, encoded using the default 5/6 rate convolutional code.

For the uplink, channel quality feedback is provided in the PCF corresponding to reserved slots. The subchannel feedback (SF) field in the PCF provides ACK/NAK and channel quality feedback for the previous slot as well as channel quality feedback (CQF) which serves as a modulation format advisory for subsequent assignments to the mobile station being acknowledged. For ACK/NAK feedback, a simple (6,1) repetition code is used. A (6,2) code is used for channel quality feedback.

The receiver 130, FIG. 4, obtains channel quality information by averaging the Euclidean distance between the received symbol sequence and the decoded sequence of symbols to obtain an implicit measure of the signal to interference plus noise ratio, C/(I+N) at the input to the decoder 265. As described in the patent applications incorporated by reference herein, this method yields good estimates under both noise limited and interference limited conditions for different coded modulation schemes across the range of Doppler frequencies. The metric computation is independent of the actual decoder implementation and can be computed using the decoded information sequence.

TABLE 2

| Channel Conditions | Channel Quality Indicator-Maximum Allowable Modulation Format |
|---|---|
| $C/(I+N) < \theta_L$ | 00 (4-level) |
| $\theta_L < C/(I+N) < \theta_H$ | 01 (8-level) |
| $C/(I+N) > \theta_H$ | 10 (16-level) |

Table 2 shows the scheme for determining the maximum allowable modulation type based on C/(I+N) estimated at the receiver. The mobile station receiver uses the channel quality metric along with knowledge of C/(I+N) thresholds, $\theta_L$, $\theta_H$ and which are transmitted over the packet broadcast control channel (PBCCH).

As in Mode 0, the byte stream obtained from Layer 3 frames is segmented into RLP frames. However, in this mode, RLP frames are smaller in size than in the incremental redundancy case. Two, three or four RLP frames are transmitted in each time slot depending on the modulation type (i.e., if 4-level, 8-level or 16-level modulation respectively, is used).

Figure 20:
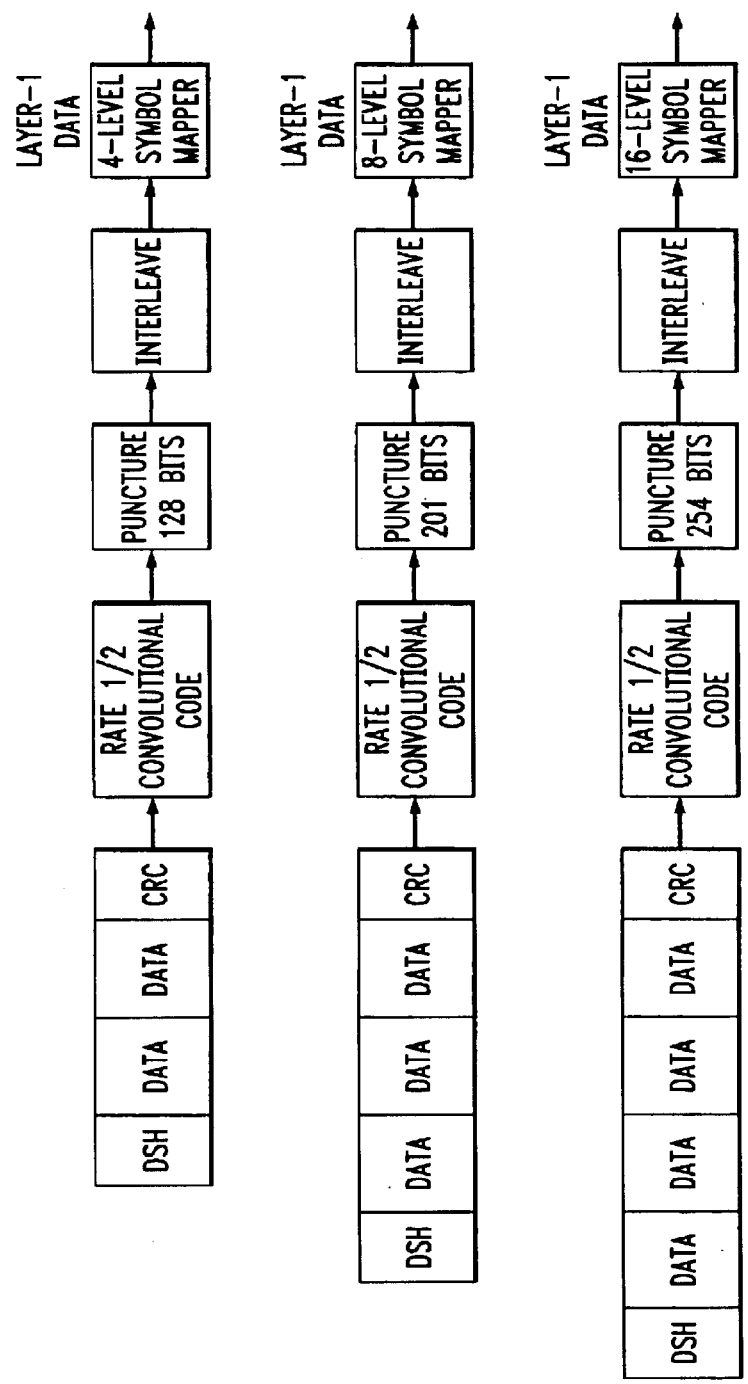
FIG. 20 shows mapping of RLP frames to layer-1 data symbols for 4-level, 8-level and 16-level modulation formats on the downlink.
Figure 21:
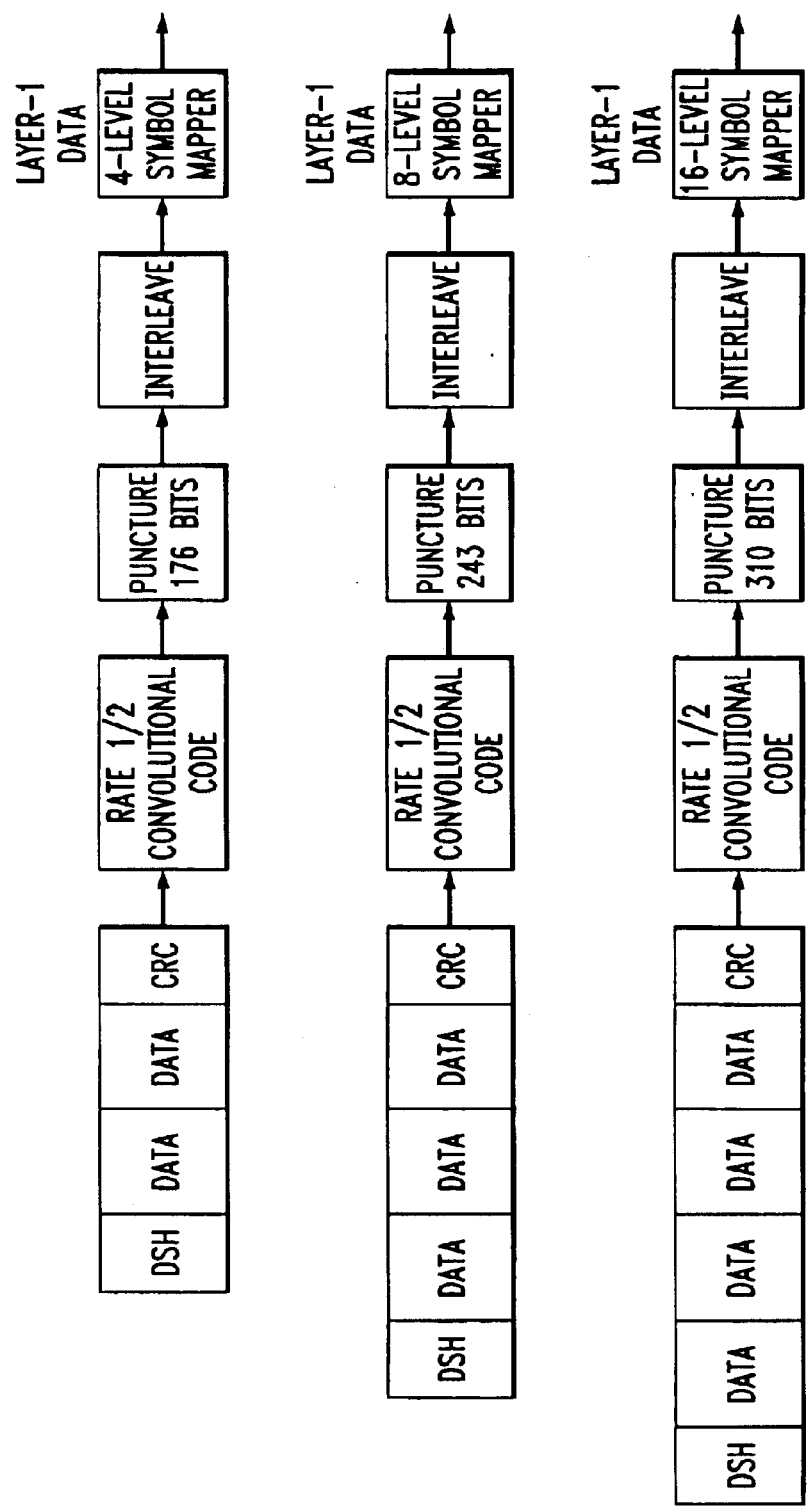
FIG. 21 shows mapping of RLP frames to layer-1 data symbols for 4-level, 8-level and 16-level modulation formats on the uplink.

Two, three or four RLP frames are concatenated with a ten bit frame check sequence (FCS) and a data segment header (DSH) which contains a ten bit block sequence number (BSN) and one bit poll indicator (PI) to request ARQ status The resulting data segment, containing RLP frames, DSH, and CRC bits, is encoded using a memory 5, rate ½ convolutional code. The coded bits are punctured and mapped to symbols that are chosen from a 4-level, 8-level or 16-level constellation. The puncturing depends on the modulation format used for the transmission of that slot as shown in FIGS. 20 and 21.

Since the frame check is on the data segment consisting of two, three, or four RLP frames, if the CRC fails at the receiver, then all frames in the slot will be lost and will have to be recovered through ARQ recovery. Assigning a FCS to each "small" RLP frame is inefficient due to excessive overhead.

On the downlink, each RLP frame consists of 88 bits (eleven octets). To each set of two, three or four RLP frames, an eleven bit DSH and ten bit CRC are added. The resulting combination is encoded using a rate ½, memory 5 convolutional code as shown in FIG. 20. At the encoder output, 128, 201 or 254 bits are punctured depending on whether 4-level, 8-level or 16-level modulation is used, and the remaining bits are mapped to the desired modulation format, and inserted in the DATA fields in the time slot.

On the uplink each RLP frame consists of 96 bits (12 octets). To each set of two, three or four RLP frames, an eleven bit DSH and ten bit CRC are added. The resulting combination is encoded using a rate ½, memory 5 convolutional code as shown in FIG. 21. At the encoder output, 176, 243 or 310 bits are punctured depending on whether 4-level, 8-level or 16-level modulation is used, and the remaining bits are mapped to the desired modulation format.

The slot formats assume the use of DPSK. If coherent PSK or QAM are used, then pilot symbols are inserted at appropriate positions in the time slot.

Figure 22:
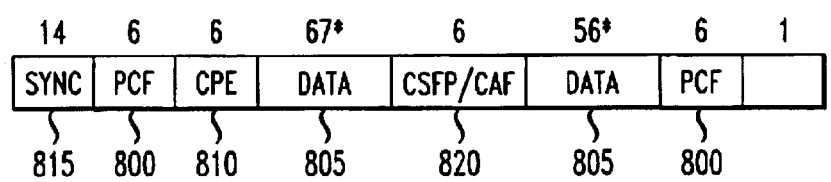
FIG. 22 shows a Mode 1 downlink time slot structure.

The downlink time slot format is shown in FIG. 22. The packet channel feedback (PCF) 800 fields are used as a mechanism for providing ACK/NAK and channel quality feedback and time slot assignments on the reverse packet data channel. The layer-1 data fields consist of two, three or four RLP frames which are constructed using the procedure described above. The adaptation field (AF) on the downlink consists of two bits which indicate the modulation format (4 level, 8 level or 16 level) used for the data. The adaptation field, superframe phase (SFP) and one reserved bit are encoded together using the same (12,8) Hamming code that is used for CDVCC in IS-136. A 12 bit CPE 810 field is used to identify the recipient of the data 805. The SYNC 805 field is transmitted using π/4-DQPSK. The CSFP/CAF 820, PCF 800 and CPE 810 are transmitted using 4-level modulation.

Figure 23:
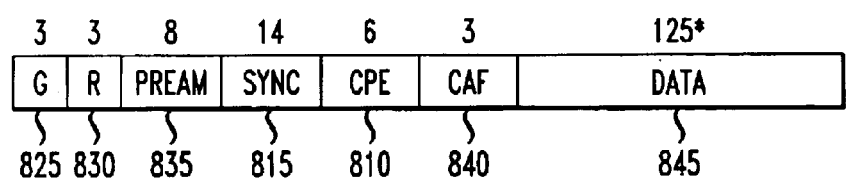
FIG. 23 shows a Mode 1 uplink time slot format.

FIG. 23 shows the proposed uplink time slot structure. The guard (G) 825, ramp (R) 830, preamble (PREAM) 835 and SYNC 815 fields are maintained as in IS-136; a new coded adaptation field (CAF) 840 is introduced to indicate the modulation format for the data 845. A 12 bit CPE 810 is used to indicate the transmitter identity. Two bits are used for the modulation type; these are encoded using a (6,2) code. G 825, R 830, PREAM 835, CPE 810 and CAF 840 are transmitted using 4-tevel modulation.

Contention accesses are transmitted using 4-level modulation. Higher level modulations (8-level and 16-level) are used in ARQ Mode CONTINUE frames by mobile stations which have more than one burst to transmit, and are sniffing for reservation based transmission opportunities.

Adaptive modulation as in Mode 0, the modulation type is fixed only for a time slot and not over an entire MAC Layer transaction. Layer 1 determines the modulation type to use for the next time slot based on the channel quality feedback from the receiver and the needs of Layer 2. Since the RLP frame sizes in Mode 1 are chosen to be the same independent of the modulation type, retransmitted frames may be sent on a different modulation type from the original transmission. The modulation formats considered are 4 level (DQPSK or π/4-coherent PSK), 8 level (differential or coherent) and 16 level (PSK, DPSK or QAM) modulation. A two bit adaptation field is used to describe the coding and/or modulation format used. Table 1 shows the mapping of the AF values to corresponding modulation formats.

A default value specifies the default DQPSK format with Rate ⅚ coding. This permits different packet data channel frame formats and interworking between incremental redundancy and coding modes.

Similar to Mode 0, the downlink Channel Quality Feedback (CQF) is provided by the mobile station on the reverse packet data channel in a layer-2 "ARQ Status" frame. The ARQ status frame may be transmitted in any reserved uplink time slot. A two bit channel quality indicator is used to denote the maximum allowable modulation type, and the cell transmitter uses this information along with knowledge of the Layer-2 data backlog in order to determine the modulation to use in subsequent slots.

For the uplink, channel quality feedback is provided in the PCF corresponding to reserved slots. The subchannel feedback (SF) field in the PCF provides ACK/NAK and channel quality feedback for the previous slot as well as channel quality feedback (CQF) which serves as a modulation format advisory for subsequent assignments to the mobile station being acknowledged. For ACK/NAK feedback, as in Mode 0, a simple (6,1) repetition code is used. A (6,2) code is used for channel quality feedback.

Stated generally, the present invention encompasses an incremental redundancy transmission communication system 102, FIG. 2. The system comprises a time slot signal generator 160 that creates a time slot signal 155 having at least one sub-slot with a fixed size and a data block signal generator 165 that creates a data block signal 170 sized to fit in the time slot. A header adder 210 that generates a header having a data block signal sequence number in the header for the time slot signal is also provided. A receiver 130, FIG. 4, is also provided that identifies in the header for the time slot signal, a number of data block signals 170 consecutively transmitted.

The invention further includes a parity block signal generator 165, FIG. 2, that creates a parity block signal 175 sized smaller than the data block signal 170 such that the parity block signal 175 and the data block signal sequence number fit within the sub-slot, and a transmitter 115 that transmits the data block signal 170 and parity block signal 175 in the sub-slot within the time slot signal.

The present invention further encompasses a method for incremental redundancy transmission in a communication system that uses radio (or retransmission) protocol link frames. The method comprises the step of creating a time slot signal having at least one sub-slot with a fixed size, creating a data block signal 170, FIG. 2, sized to fit in the sub-slot, establishing a header having a data block signal sequence number in the header for the time slot signal and identifying in the header for the time slot signal, the number of data block signals 170 consecutively transmitted. The steps of providing, in a header of the time slot signal, a data block sequence number for a first data block signal 170 in a sequence of data block signals 170 and creating a parity block signal 175 smaller than the data block signal 170 such that the parity block signal 175 sequence number fits within the sub-slot signal are also provided.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

What is claimed is:

1. A communication system using incremental redundancy to communicate information comprising:
   a time slot signal generator that provides time slotted signals;
   a transmitter that transmits a plurality of at least three modulation schemes and adapts among the plurality of at least three modulation schemes;
   the transmitter transmits different amounts of information from a group that includes data information and parity information in each time slot signal depending on the modulation scheme of the plurality of at least three modulation schemes used;
   a receiver that can identify which modulation scheme is used by the transmitter for the time slotted signals by the different amounts of information from the group of data information and parity information in each time slot signal depending on which of the plurality of at least three modulation schemes is received;
   the receiver decoding on the time slotted signals according to the identified modulation scheme to reproduce the data information as an output;
   the transmitter adapts among the plurality of at least three modulation schemes to maximize data throughput in a presence of noise;
   a second time slot signal generator that provides time slotted signals having a varying integer number of fixed size sub-slots within each time slot depending on the modulation scheme;
   a data block signal generator that provides data block signals, each having at least three data bits and sized to fit within one of the fixed size sub-slots;
   a parity block signal generator that provides parity block signals, each having at least three data bits and sized to fit in one of the fixed size sub-slots;
   a second transmitter that transmits block signals from a group of data block signals and parity block signals within each of the number of sub-slots within each time slot signal; and
   a second receiver that identifies each sub-slot carrying block signals from the group of data block signals and parity block signals within each of the number of sub-slots.

2. The system of claim 1 wherein the parity block signal generator provides a parity block that is sized smaller than the data block signal such that the parity block signal and the corresponding data block signal sequence number fit within a sub-slot.

3. The system of claim 1 wherein the second receiver identifies in a header for each time slot signal, a respective number of data block signals and parity block signals in the time slot signal.

4. The system of claim 1 wherein the data block signal generator and parity block signal generator provide an integer number of total data block signals and the parity block signals that fit in each time slot signal.

5. The system of claim 1 wherein the second transmitter transmits a parity block signal with a corresponding data block signal sequence number in one of the sub-slots.

6. The system of claim 1 including a header adder that provides a header having a data block signal sequence number therein for one of the slot signals.

7. The system of claim 1 including a receiver that identifies the sequence of data block signals in one of the time slot signals as being consecutive from a first data block.

8. The system of claim 1 including a computation unit that computes a frame check sequence, and an adder that adds the frame check sequence to a radio link protocol frame to define a frame Bi.

9. The system of claim 8 including an encoder connected to computation unit that encodes the frame Bi into N data bits and N parity bits, a first segmenter that segments the N data bits into D data block signals, a second segmenter that segments the N parity bits into P parity block signals of equal size, and a puncturing unit that selectively punctures the P parity block signals to insert a header.

10. The system of claim 9 wherein the header includes a header type identifier and a corresponding data block signal sequence number for selected parity block signals.

11. The system of claim 9 including a memory unit that stores information corresponding to N data bits and N parity bits.

12. The system of claim 11 wherein the memory unit includes a bitmap for delivered D data block signals and P parity block signals.

13. A communication system having incremental redundancy comprising:
   means for providing time slotted signals;
   means for transmitting different amounts of information from a group that includes data information and parity information in each time slot signal depending on which of a plurality of at least three modulation schemes is used;
   means for identifying different amounts of information from the group that includes data information and parity information in each time slot signal slot signal depending on the modulation scheme used; and
   means for adapting the modulation scheme of the transmitting means to increase information throughput;
   means for providing time slotted signals having a varying integer number of fixed size sub-slots within a time slot depending on the modulation scheme;
   means for providing data block signals, each sized to fit in one of the sub-slots;

means for providing parity block signals, each sized to fit in one of the sub-slots;

means for transmitting amounts of information from a group that includes data information and parity information in sub-slots within the time slot signal; and means for identifying the sub-slots carrying information from a group that includes data information and parity information in each time slot signal.

14. The system of claim 13 including means for inserting a control block signal in place of a parity block signal.

15. The system of claim 14 wherein the control block contains channel quality feedback and a receive status bitmap.

16. The system of claim 13 wherein a header and other pre-determined fields are modulated using a different modulation scheme from that used for transmitting information from the group that includes data information and parity information in each time slot signal.

17. The system of claim 14 wherein the control block is used to indicate a start or a completion of a packet mode transaction.

18. An incremental redundancy transmission communication system for communicating information comprising:

a time slot signal generator that provides time slotted signals;

a transmitter that transmits a plurality of modulation schemes, the transmitter transmits different amounts of information from a group that includes data information and parity information in each time slot signal depending on the modulation scheme of the plurality of modulation schemes is used;

a receiver that can identify which modulation scheme is used by the transmitter for the time slotted signals by the different amounts of information from the group of data information and parity information in each time slot signal depending on the modulation scheme used;

the receiver decoding on the time slotted signals according to the identified modulation scheme to reproduce the data information as an output;

a second time slot signal generator that provides time slotted signals having a varying integer number of fixed size sub-slots within each time slot depending on the modulation scheme;

a data block signal generator that provides data block signals, each sized to fit within one of the fixed size sub-slots;

a parity block signal generator that provides parity block signals, each sized to fit in one of the fixed size sub-slots;

a second transmitter that transmits block signals from a group of data block signals and parity block signals within each of the number of sub-slots within each time slot signal;

a second receiver that identifies each sub-slot carrying block signals from the group of data block signals and parity block signals within each of the number of sub-slots;

wherein the second transmitter sizes each data block signals for operation in one of a plurality of modulation schemes;

wherein the second transmitter selectively sizes the data block signals so that the data block signals fit within the sub-slot of each one of the plurality of modulation schemes; and wherein the transmitter uses a code rate defined by an equation $$\frac{ND}{(ND+MP)} = \frac{N}{(2N-q)}$$

in which N is a data block signal size, M is a parity block signal size, q is a length of a data block signal sequence number field, D is a number of data blocks and P is a number of parity blocks.

* * * * *